(12) United States Patent
Albizuri

(10) Patent No.: US 7,963,763 B2
(45) Date of Patent: *Jun. 21, 2011

(54) MULTI-GAS COOKER, WITH A ROTARY VALVE PROVIDED WITH INTERCHANGEABLE REGULATING MEANS

(75) Inventor: Iñigo Albizuri, Muxika (ES)

(73) Assignee: Coprecitec, S.L., Aretxabaleta (Guipuzcoa) (ES)

( * ) Notice: Subject to any disclaimer, the term of this patent is extended or adjusted under 35 U.S.C. 154(b) by 0 days.

This patent is subject to a terminal disclaimer.

(21) Appl. No.: 12/639,856

(22) Filed: Dec. 16, 2009

(65) Prior Publication Data

US 2010/0089386 A1 Apr. 15, 2010

Related U.S. Application Data

(63) Continuation of application No. 12/069,657, filed on Feb. 12, 2008, now Pat. No. 7,641,470, which is a continuation of application No. 11/143,785, filed on Jun. 1, 2005, now abandoned.

(30) Foreign Application Priority Data

Feb. 10, 2005 (ES) ................ 200500309 U

(51) Int. Cl.
*F23N 1/00* (2006.01)
*F23N 3/02* (2006.01)
*F23D 14/00* (2006.01)
*F23D 14/02* (2006.01)
*F23D 14/04* (2006.01)

(52) U.S. Cl. .............. 431/2; 431/18; 431/354; 251/127; 251/205; 126/39 R; 126/39 E; 137/269

(58) Field of Classification Search ............ 431/2, 12, 431/18, 61, 62, 65, 72, 354; 126/25 R, 39 E, 126/39 N, 39 R; 137/267, 270; 251/91, 127, 205–209; 16/441

See application file for complete search history.

(56) References Cited

U.S. PATENT DOCUMENTS 791,260 A 5/1905 Fuller
(Continued)

FOREIGN PATENT DOCUMENTS

DE 3039378 5/1982
(Continued)

OTHER PUBLICATIONS

PCT/EP2006/001143 International Preliminary Report on Patentability dated Aug. 14, 2007.

(Continued)

*Primary Examiner* — Steven B McAllister
*Assistant Examiner* — Daniel E Namay
(74) *Attorney, Agent, or Firm* — Tim L. Kitchen; Peter B. Scull; Berenbaum Weinshienk PC

(57) ABSTRACT

The cooking appliance (1) having a control panel (2) is equipped with one or more gas flow (Q) regulating valves, wherein the rotary regulating plug (6) is provided with various peripheral through holes (16-19). The control knob (9) being interchangeable for fitting to the actuating shaft (7), is chosen from the two units available, one and the other permitting different angular limit positions of the regulating plug (6) for the supply of a constant minimum gas flow Qmin, adjusted each one for a different type of gas N gas or LP gas. The outlet conduit (5) of the valve is equipped with a further injector nozzle (21,23) for adjusting a constant gas flow Qmax to be fed into the conduit (25) of the correspondent burner, when the cooking appliance is supplied with a LP gas.

4 Claims, 1 Drawing Sheet

U.S. PATENT DOCUMENTS

| | | | |
|---|---|---|---|
| 1,215,653 A | | 2/1917 | Hale |
| 1,526,500 A | * | 2/1925 | Kasch ............................... 74/553 |
| 1,711,436 A | | 4/1929 | Williams |
| 1,869,764 A | * | 8/1932 | Methudy .................... 126/39 B |
| 1,921,762 A | * | 8/1933 | Leins ........................ 126/39 N |
| 1,940,171 A | | 12/1933 | Huss |
| 2,101,356 A | * | 12/1937 | Zak ............................... 251/207 |
| 2,650,612 A | * | 9/1953 | Brumbaugh ............... 137/637.4 |
| 2,650,613 A | * | 9/1953 | Brumbaugh ............... 137/637.4 |
| 2,723,102 A | | 11/1955 | Mueller |
| 2,987,078 A | | 6/1961 | Du Perow |
| 3,001,547 A | | 9/1961 | Brumbaugh |
| 3,068,902 A | | 12/1962 | Brumbaugh |
| 3,093,155 A | | 6/1963 | Dawes |
| 3,107,082 A | | 10/1963 | Reynolds |
| 3,313,490 A | * | 4/1967 | Loveland ...................... 239/596 |
| 3,448,923 A | * | 6/1969 | Domenick .................. 236/99 R |
| 3,537,473 A | * | 11/1970 | Dezurik, Jr. ............... 137/556.6 |
| 3,643,688 A | | 2/1972 | Meinert |
| 3,964,514 A | | 6/1976 | Manoogian et al. |
| 4,020,870 A | | 5/1977 | Carlson |
| 4,140,297 A | | 2/1979 | Bussell |
| 4,366,947 A | | 1/1983 | Voege |
| 4,499,630 A | * | 2/1985 | Harris et al. .................... 16/441 |
| 4,637,429 A | | 1/1987 | Dietiker et al. |
| 4,862,917 A | | 9/1989 | Genbauffe |
| 4,947,891 A | | 8/1990 | Genbauffe |
| 5,009,393 A | | 4/1991 | Massey |
| 5,020,774 A | | 6/1991 | Christianson |
| 5,082,023 A | | 1/1992 | D'Alayer de Costemore d'Arc |
| 5,141,018 A | * | 8/1992 | Guterman .................... 137/375 |
| 5,238,398 A | | 8/1993 | Harris |
| 5,345,838 A | * | 9/1994 | Howie, Jr. ...................... 74/553 |
| 5,413,141 A | | 5/1995 | Dietiker |
| 5,435,343 A | | 7/1995 | Buezis |
| 5,522,429 A | | 6/1996 | Bechte |
| 5,899,439 A | | 5/1999 | Gottwald |
| 5,931,387 A | | 8/1999 | Hurley et al. |
| 5,983,884 A | * | 11/1999 | Lee ............................. 126/39 R |
| 5,992,457 A | | 11/1999 | Humpert |
| 6,027,335 A | * | 2/2000 | Griffioen ...................... 431/266 |
| 6,162,048 A | | 12/2000 | Griffioen |
| 6,170,507 B1 | | 1/2001 | Dalton et al. |
| 6,341,760 B1 | | 1/2002 | Rawlings |
| 6,347,784 B1 | * | 2/2002 | Philipps-Liebich et al. ..... 251/92 |
| 6,357,721 B1 | | 3/2002 | Maurer |
| RE37,617 E | * | 4/2002 | Sherman ....................... 137/557 |
| 6,394,081 B1 | * | 5/2002 | Aguirre-Esponda et al. ... 126/42 |
| 6,520,481 B2 | | 2/2003 | Harneit |
| 6,640,390 B1 | * | 11/2003 | Lai ................................. 16/441 |
| 6,758,242 B2 | * | 7/2004 | Jones et al. ................ 137/625.41 |
| 6,871,803 B1 | | 3/2005 | Ohmi et al. |
| 6,941,962 B2 | | 9/2005 | Haddad |
| 7,156,370 B2 | | 1/2007 | Albizuri |
| 7,237,570 B2 | | 7/2007 | Gamard |
| 7,458,386 B2 | | 12/2008 | Zhang |
| 7,641,470 B2 | | 1/2010 | Albizuri |
| 7,651,330 B2 | | 1/2010 | Albizuri |
| 2003/0010952 A1 | | 1/2003 | Morete |
| 2004/0089830 A1 | | 5/2004 | Beyrak |
| 2005/0109967 A1 | * | 5/2005 | Ohmi et al. .................. 251/127 |
| 2005/0202361 A1 | | 9/2005 | Albizuri |
| 2006/0060251 A1 | * | 3/2006 | Gamard et al. ............... 137/613 |
| 2006/0201496 A1 | * | 9/2006 | Shingler .................... 126/39 N |
| 2008/0138749 A1 | | 6/2008 | Albizuri |
| 2008/0156378 A1 | | 7/2008 | Zhang |
| 2008/0202496 A1 | | 8/2008 | Albizuri |
| 2008/0289615 A1 | | 11/2008 | Parrish |
| 2009/0047610 A1 | * | 2/2009 | Teng ............................... 431/18 |
| 2010/0089385 A1 | | 4/2010 | Albizuri |
| 2010/0089386 A1 | | 4/2010 | Albizuri |
| 2011/0005508 A1 | | 1/2011 | Albizuri |

FOREIGN PATENT DOCUMENTS

| | | |
|---|---|---|
| EP | 0805310 | 11/1997 |
| FR | 1517003 | 2/1968 |
| FR | 2642148 | 7/1990 |
| GB | 1298809 | 12/1972 |
| GB | 1329893 | 9/1973 |
| WO | WO/2006/084690 | 8/2006 |

OTHER PUBLICATIONS

PCT/EP2006/001143 International Search Report dated Aug. 1, 2008.

* cited by examiner

MULTI-GAS COOKER, WITH A ROTARY VALVE PROVIDED WITH INTERCHANGEABLE REGULATING MEANS

The present application is a continuation application of copending patent application Ser. No. 12/069,657, filed on Feb. 12, 2008, which is entitled "MULTI-GAS COOKER, WITH A ROTARY VALVE PROVIDED WITH INTERCHANGEABLE REGULATING MEANS", which is a continuation of patent application U.S. Ser. No. 11/143,785, which was filed on Jun. 1, 2005, and claims priority to Spanish Patent Application ES-U200500309, which was filed on Feb. 10, 2005, the disclosures of all of which being herein incorporated by reference.

TECHNICAL FIELD

The present invention relates to a gas valve of the conical rotary plug type attached to an actuating shaft, being the gas valve mounted on the panel of a cooking appliance and its outlet conduit faced to a burner inlet, wherein the rotary plug is provided with a control knob, and aperture means for adjusting the flow rate according to the fuel gas family supplied to the cooking appliance, and the outlet conduit with an injection means.

PRIOR ART

Gas valves of the above-defined type are already known, wherein the gas valve is mounted on the front control panel with the actuating shaft passing through a external control panel in the appliance, and the valve body resting inside the appliance faced to the fuel inlet of a burner. The external free end of the actuating shaft is fitted with a rotary control knob inserted in the latter. The control knob is removable from the shaft by pulling it out. The hollow body of the valve has its own gas outlet conduit which is connected to the respective appliance burner. The outlet conduit is provided with an injector nozzle having a calibrated discharge orifice in correspondence with the gas family supplied to the appliance, LP gas or N gas. In the spacing apart between the discharge nozzle of the valve and the burner inlet, is taken the primary air to feed the fuel mixture into the burner.

An example of rotary valve of the above type is disclosed in U.S. Pat. No. 6,520,481-B2, having its actuating shaft coupled to a frusto-conical regulating plug or valve plug, which is able to rotate a given angle for the supply of a gas flow from two angular positions spaced around 120.degree. apart, corresponding respectively to a high or maximum flow "Qmax" and to a low or minimum flow "Qmin", the latter applied to "gentle boiling". The rotation of the shaft as far as one of the angular positions, is started from an initial valve closed "OFF" position.

In this type of known valves the actuating shaft has a pin protruding in a radial direction to limit its angular travel, guided on a circular surface in the inner face of the body cover or valve cap, or in some other part of the valve body. The total travel of the regulating plug thus limited is, for instance, 270 degrees from the OFF position. The end position corresponds to Qmin. Any of the flows Qmax, Qint (intermediate flow) and Qmin is regulated by way of a corresponding hole or groove in the regulating plug facing the outlet conduit. All the flow rate are supplied from a common inlet conduit through an inner chamber in the regulating plug which is in communication with an outlet conduit. The Qmin outlet hole or groove shaped opening has an area of calibrated section for a standard type of given fuel gas, adjusted according to the output power of the cooking appliance burner.

Solutions are already known for a single valve to be mounted on cooking appliances that use two different types of gas, such as natural gas (NG) or liquefied petroleum gas (LPG). For example in U.S. Pat. No. 5,009,393, an additional valve element in the form of a sleeve is inserted in the inner chamber of the valve regulating plug. The area of the opening section for the passage of gas flow towards the outlet, that which corresponds to low flow or minimum flow Qmin, is adjusted by rotating this added valve sleeve which thus modifies the uncovered section area of the outlet opening. This known solution has the disadvantage that for adjusting the Qmin for the rotation of the valve sleeve, it is necessary to use a screwdriver, which has to be inserted from an opening in the actuating shaft until it reaches the valve sleeve and to transmit a precise turn. A known regulating gas valve, for example the disclosed in U.S. Pat. No. 4,947,891-A, comprises a rotary valve plug coupled to a passage disc provided aperture means for regulating the gas flow supplied to the burner, and an injector nozzle threaded to the outlet conduit. The passage disc is held stationary in the valve housing, and provides an arc groove restricting the passage area for the flow, for use with both LP gas and N gas, while the injection orifice of the nozzle is limiting the large changes of gas flow.

DISCLOSURE OF THE INVENTION

The object of the invention is a gas domestic cooking appliance, provided with at least a rotary valve of the type with a frusto-conical regulating plug coupled to an actuating shaft and to a control knob, being capable of supplying the different required flows of gas lying at a plurality of angular positions, of either of the two different types of gas, N gas or LP gas, the valve having a control knob being interchangeable on the actuating shaft, with a means for limiting the angle of rotation of the regulating plug, and a mountable injector nozzle in the valve outlet conduit, which can be or not provided, in order the valve to be adapted to the type of gas used by the appliance.

The use of a single valve unit for regulating the flow of two different gas families is an advantage of the gas valve invention, when mounted on a cooking appliance. During the start-up of the cooking appliance the user only has to carry out a choice for a control knob from the two possible units accompanying the valve in accordance with the type of fuel gas NG or LP appropriate for the cooking appliance. In this way, there is no need to use tools for adjusting the flow, nor to learn how to adjust the regulating plug as is required in the prior art valve.

The gas valve according to the invention is capable of providing two angular positions of the regulating plug, both spaced apart from each other to supply a different minimum flow Qmin according to the type of gas, NG or standard LPG, used as the fuel for the appliance, being the two different angular positions established by means of a respective rotation stop. At the same time, the user chooses for providing or not the outlet conduit of the valve with an injector nozzle to supply a maximum flow, Qmax, of LP gas or N gas respectively. Neither it is necessary to use tools for carrying out this mounting operation.

DETAILED DESCRIPTION OF AN EMBODIMENT OF THE INVENTION

Figure 1:
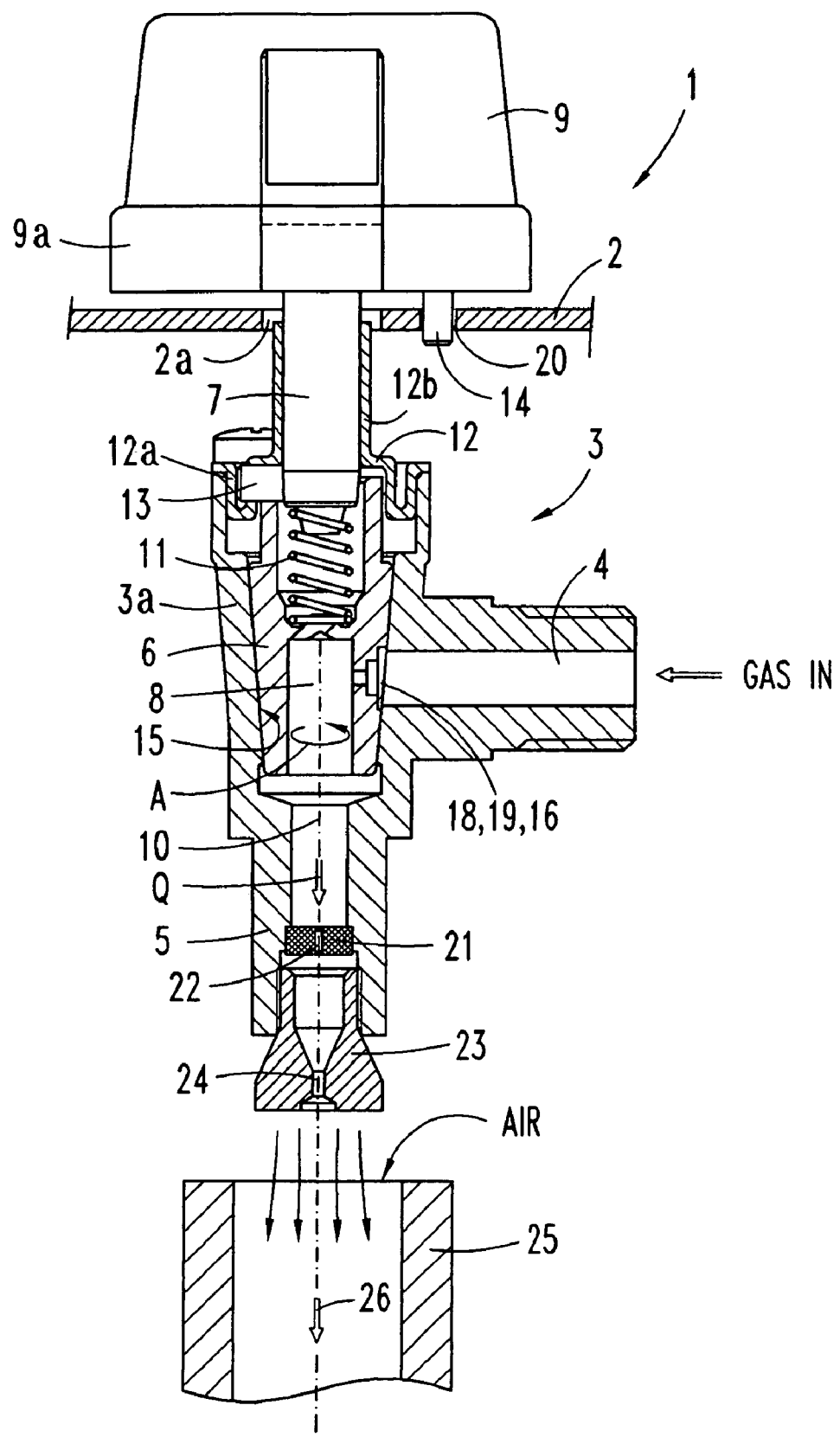
FIG. 1 is a sectional view of a gas valve according to the invention, fitted on a panel of a cooking appliance.

In reference to FIG. 1, an embodiment of a gas cooking appliance 1 such as a barbecue comprises a control panel 2 on which are mounted one or more rotary gas valves 3 of the type with a frustro-conical regulating plug 6. The cooking appliance 1 may be of two types in respect of the type of gas supplied, natural gas (NG) or liquefied gas (LPG) from the external source—GAS IN—through a valve inlet conduit 4 in the valve body 3a. Each one of the valves 3 mounted on the panel 2 is always of a single type, all with a same valve body 3a and regulating plug 6. The inlet flow "Q" is transmitted to an internal chamber 8 in regulating plug 6 in communication with an outlet conduit 5 in the valve body 3a. The regulating plug 6 rotates around a central axis 10 actuated by shaft 7 for the supply of the flow "Q", which is directed towards a burner inlet duct 25 on the appliance, being the latter specifically adapted to either N gas or LP gas supplying.

The valve body 3a has an elongated shape with a frusto-conical central housing cavity 15, wherein the regulating plug 6 is pushed by a spring 11 for a tight sealing. The free end of the actuating shaft 7 is installed passing through a hole 2a in the appliance panel 2, and afterwards the user fits it with a control knob 9, which is chosen from the two different units of control knob 9, both supplied to the user with each valve unit 3. A cover or valve cap 12 protecting the housing cavity 15, has a tubular bushing 12b for guiding the actuating shaft 7 in rotation.

The regulating plug 6 may rotate with the shaft 7 an angle "A" in either of the two directions from an initial angular position "zero" degrees corresponding to the valve closed condition "OFF", to an angular position "A" between 90.degree. and 270.degree. The OFF position is the initial end of the rotational travel "A", and it is established for example by a radial pin 13 on the shaft. The cover 12 presents a sliding surface for the radial pin 13, up to a recess 12a in the cover acting as a stop for the rotation of the radial pin 13.

In reference to the valve embodiment represented in FIG. 1, from the angular position OFF rotating in a clockwise direction, the frusto-conical plug 6 may regulate the supply of different gas flows, a maximum flow "Qmax", a minimum "Qmin" and an intermediate flow "Qint" between the Qmax and the Qmin, in function of the rotated angle "A". A constant minimum flow "Qmin" of the N gas must be higher than a "Qmin" of the LP gas, when supplied to a respective burner in both cases of the same power. In function of whether N or LP gas is supplied to the cooking appliance, the control knob 9 to be fitted on the actuating shaft 7 is distinguished for example by means of a lug 14 integral with the control knob. The control knob 9 represented on the appliance in FIG. 1 is adapted for the supply of N gas, having a protuberance or lug 14 projecting from a knob base 9a facing the panel 2. The second type of control knob 9 having not the protuberance 14, is chosen for its mounting on a cooking appliance that uses LP gas.

The regulating plug 6 rotates to a determined angular position for the supply of a maximum flow "Qmax" of either NG or LPG on both types of cooking appliance 1. The Qmax inflow is regulated by a through hole 16 in the regulating plug, facing the inlet conduit 4. If the regulating plug 6 is rotated further, an intermediate flow "Qint" will be supplied through a groove which has a decreasing area. In accordance with the angle rotated, a through hole 18 or a through hole 19 for a "Qmin" flow is facing the inlet conduit 4 at an ensuing angular position different from one another depending on the gas supplied to the valve, N gas or LP gas respectively. Diameter of each one of holes 18 and 19 are calibrated for the correspondent supply of a Qmin.

When installed on the panel 2, the control knob unit 9 chosen for the supply of LPG, this has no lug 14 or any other element for limiting the angle "A" of rotation. Thus, the regulating plug 6 may rotate as far as an angular position of 270 degrees. The cover 12, provided with the tubular portion 12b for guiding the valve shaft 7, and said recess 12a for limiting said longer angular travel corresponding to the LP gas Qmin, is made economically by die-stamping operations only. The economical cost of moulding two types of control knob 9, with and without integral lug 14 for guiding its rotation, is also low.

Besides that described above, other embodiments of the regulating passage openings 18,19 for the different values of Qmin are possible. Half of the control knob 9 units of the kind applied to the NG appliance, may be manufactured with some integrated guiding means 14 on the control knob 9, and interact with some part of the cooking appliance 1 associated with the panel 2, for example a running slot 20 in a panel wall, in order a limit position to be arranged of rotation travel other than that imposed by the actuating shaft.

The arrangement of the two different stop means 12a and 20, respectively in the valve body 3a and on the control panel 2, each one with a pre-set circular extension, matches up with the two angular travels "A" corresponding to that of the two hole passages 18 and 19 for supplying a constant NG Qmin or a constant LPG Qmin. In this way, a single valve unit 3 is used, without having to make any adjustment, valid for any type of gas supplied to the cooking appliance 1.

The burner of the cooker appliance (not represented in the drawing), supplied by the valve unit 3, is placed with its feed conduit 25 facing the valve outlet conduit 5. The space of air apart from the burner conduit 25 permits the fuel mixture 26 of primary air with the Qmax flow of outgoing gas from the valve 3 for injection into the burner feed conduit 25.

In accordance with the type of gas, N gas or LP gas, in order to provide the valve 3 with means for adjustment and injection of the Qmax gas flow outgoing from the regulating plug 6, the valve outlet conduit 5 has a press-in or threaded disc 21 inserted for the restriction of the Qmax flow through a calibrated central hole 22, which permits the passage of a given Qmax flow of N gas, substantially higher than the Qmax of LPG gas which it is necessary to inject into the burner of the same output. The restrictor disc 21 remains fitted on the valve all the time irrespective of the type of gas used. When the cooker appliance 1 is supplied with LP gas, it is necessary to restrict the outgoing Qmax flow so as to adapt the output of the burner, so the valve outlet conduit 5 is also fitted with an injection nozzle 23, threaded manually into the mouth of the conduit 5, and it has a calibrated hole 24 for a given Qmax flow of LP gas, substantially smaller than the hole in the restrictor disc, the latter secured in a manner valid for the passage of a Qmax both of N gas and of LP gas.

Thus, by means of the interchangeable control knob 9 and the installation or otherwise of the injection nozzle 23, all the cooker appliances, whether they be N gas or LP gas, are fitted with the same valve units 3 without the need to make any flow regulating adjustment. Together with the valve unit 3, the user receives a kit containing two different control knob units 9, easily distinguishable from each other, and an injection nozzle 23. In accordance with the type of gas used, the user chooses one of the controls 9 for manual installation on the actuating shaft 7, and also decides whether or not to install the injection nozzle 23, which is also fitted manually for the injection of LP gas without the need for tools.

What is claimed is:

1. A valve comprising:
    a valve body having a rotatable regulating organ positioned between a valve inlet and a valve outlet, the regulating organ configured to vary the flow rate of the gaseous fuel at the valve outlet as a function of an angular position of the regulating organ, a first angular position of the regulating organ determines a first minimum flow rate of a natural gas, and a second angular position of the regulating organ, successive to the first angular position, determines a second minimum flow rate of a liquefied petroleum gas,
    a control knob used to manipulate the angular position of the regulating organ coupled to the regulating organ by an actuating shaft, the control knob having a feature to prevent rotation of the regulating organ beyond the first angular position, absent the presence of the feature on the control knob the regulating organ is rotatable to the second angular position,
    the valve outlet having a restriction that determines a maximum flow rate of the natural gas.

2. A gas burning appliance adapted for a supply of natural gas and liquefied petroleum gas to a burner comprising:
    at least one regulating valve with a valve body, the valve body having a rotatable regulating organ operationally coupled to an actuating shaft that protrudes from a control panel of the cooking appliance, the regulating organ positioned between a valve inlet and a valve outlet and configured to vary the flow rate of the gaseous fuel at the valve outlet as a function of an angular position of the regulating organ, a first angular position of the regulating organ determining a first minimum flow rate of the natural gas, and a second angular position of the regulating organ, successive to the first angular position, determining a second minimum flow rate of the liquefied petroleum gas,
    a control knob attached to the actuating shaft useable to manipulate the angular position of the regulating organ, the control knob having a feature that cooperates with a part of the appliance other than the valve to prevent rotation of the regulating organ beyond the first angular position, the regulating organ rotatable to the second angular position successive to the first angular position absent the presence of the feature on the control knob,
    the valve outlet having a restriction that determines a maximum flow rate of the natural gas.

3. The gas burning appliance of claim 2 wherein the feature of the control knob projects from a base of the control knob facing the control panel and travels within a groove in the control panel, the groove having an end corresponding to the first angular position.

4. The gas burning appliance of claim 2 wherein the actuating shaft has associated with it an engagement feature that cooperates with a part of the valve to impede rotation of the regulating organ beyond the second angular position.

* * * * *